(12) United States Patent
Dande et al.

(10) Patent No.: US 11,243,857 B2
(45) Date of Patent: *Feb. 8, 2022

(54) EXECUTING TEST SCRIPTS WITH RESPECT TO A SERVER STACK

(71) Applicant: Bank of America Corporation, Charlotte, NC (US)

(72) Inventors: Pratap Dande, Saint Johns, FL (US); Manikumar Juttukonda, Jacksonville, FL (US); Daniel P. McCoy, St. Augustine, FL (US); John Mckenzie, Jacksonville, FL (US)

(73) Assignee: Bank of America Corporation, Charlotte, NC (US)

( * ) Notice: Subject to any disclaimer, the term of this patent is extended or adjusted under 35 U.S.C. 154(b) by 70 days.

This patent is subject to a terminal disclaimer.

(21) Appl. No.: 16/885,836

(22) Filed: May 28, 2020

(65) Prior Publication Data
US 2020/0293416 A1 Sep. 17, 2020

Related U.S. Application Data

(63) Continuation of application No. 15/940,156, filed on Mar. 29, 2018, now Pat. No. 10,733,070.

(51) Int. Cl.
*G06F 11/00* (2006.01)
*G06F 11/263* (2006.01)
*G06F 11/22* (2006.01)

(52) U.S. Cl.
CPC ........ *G06F 11/263* (2013.01); *G06F 11/2294* (2013.01)

(58) Field of Classification Search
None
See application file for complete search history.

(56) References Cited

U.S. PATENT DOCUMENTS

| | | | |
|---|---|---|---|
| 8,095,636 B2 | 1/2012 | Linville et al. |
| 8,892,947 B1 | 11/2014 | Chopra et al. |
| 8,949,791 B2 | 2/2015 | Lu et al. |
| 9,021,438 B2 | 4/2015 | Dayan |
| 9,064,046 B1 | 6/2015 | Cormier et al. |
| 9,317,411 B2 | 4/2016 | Kalyanasundram |

(Continued)

OTHER PUBLICATIONS

Google Scholar/Patents—text refined (Year: 2021).*

*Primary Examiner* — Christopher S McCarthy
(74) *Attorney, Agent, or Firm* — Banner & Witcoff, Ltd.

(57) ABSTRACT

A functional test execution engine ("FTEE") may be configured to execute test scripts with respect to a server stack. The FTEE may be communicatively coupled to a test script storage device, which may store the test scripts. The FTEE may select one or more test scripts for execution with respect to the server stack. The one or more test scripts may carry out maintenance or diagnostic functions for the server stack. The FTEE may determine the processing resources of the server stack and, based on those processing resources, select a first set of test scripts from the one or more test scripts to execute. The FTEE may cause the first set of test scripts selected to execute with respect to the server stack in order to generate test script results. The FTEE may store the test script results for subsequent analysis and use during execution of subsequent test scripts.

19 Claims, 3 Drawing Sheets

(56) References Cited

U.S. PATENT DOCUMENTS

| | | |
|---|---|---|
| 9,514,031 B2 | 12/2016 | Jordan |
| 9,524,229 B2 | 12/2016 | Kalyanasundram |
| 9,524,230 B2 | 12/2016 | Kalyanasundram |
| 9,852,050 B2 | 12/2017 | Dvorkin et al. |
| 2010/0199130 A1 | 8/2010 | Rolia et al. |
| 2011/0275170 A1 | 11/2011 | Van Wagenen et al. |
| 2012/0042208 A1 | 2/2012 | Chen |
| 2013/0174178 A1 | 7/2013 | Chakraborty et al. |
| 2014/0089887 A1 | 3/2014 | Bhattacharyya et al. |
| 2014/0149986 A1 | 5/2014 | S M et al. |
| 2015/0100684 A1 | 4/2015 | Maes et al. |
| 2015/0269062 A1 | 9/2015 | Sharda et al. |
| 2016/0004628 A1 | 1/2016 | Gugri |
| 2018/0060223 A1 | 3/2018 | Cheung et al. |
| 2018/0181456 A1 | 6/2018 | Kim |
| 2018/0253364 A1 | 9/2018 | Dutta et al. |
| 2018/0253365 A1 | 9/2018 | Dutta et al. |

\* cited by examiner

EXECUTING TEST SCRIPTS WITH RESPECT TO A SERVER STACK

CROSS REFERENCE TO RELATED APPLICATIONS

This application is a continuation of, and claims priority to, co-pending U.S. application Ser. No. 15/940,156, filed Mar. 29, 2018, and entitled "Executing Test Scripts with Respect to a Server Stack," which is incorporated herein by reference in its entirety.

TECHNICAL FIELD

This application generally relates to the management and control of processes and tasks in electrical computers and digital processing systems. More particularly, aspects of this application are directed to task management and control including process scheduling, priority scheduling, and resource allocation.

BACKGROUND

The size and scope of enterprise systems has created significant difficulties for system administrators. For example, an enterprise may have hundreds of thousands of terabytes of data in a "big data" store, all served by a plurality of services. Such enterprise systems, particularly as a result of their volume, require routine maintenance: services which execute with respect to the big data store must be tested and updated, the validity of all or portions of the big data store must be verified, and/or other similar operations. Such maintenance requirements may easily exceed the capabilities of human technicians: for example, diligent weekly testing of a big data store and its associated services may take an entire team more than a week of work.

One reason why big data systems take so long to maintain is that maintenance and/or diagnostic services executing on big data stores may be configured very differently and require very different handling. For example, testing the operating status of one service may simply require a single mouse click, but may take up 90% of the processing resources of a server to calculate. In contrast, testing the operating status of another service may require complex configuration and numerous hand-typed queries, but may require a negligible amount of processing resources of the same server. Moreover, because such services are maintained by different companies and often serve very different roles for a big data store, little in the way of standardization exists.

SUMMARY

The following summary presents a simplified summary of certain features. The summary is not an extensive overview and is not intended to identify key or critical elements.

Systems, apparatuses, and methods are described for a managing execution of a plurality of test scripts on a server stack. One or more test scripts may execute with respect to a server stack. A first test scripts to execute with respect to the server stack may be determined. Based on the processing resources of the server stack, the first test scripts may execute with respect to the server stack. A second plurality of test scripts for execution with respect to the server stack may also be determined based on the processing resources while monitoring the processing resources of the server stack.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
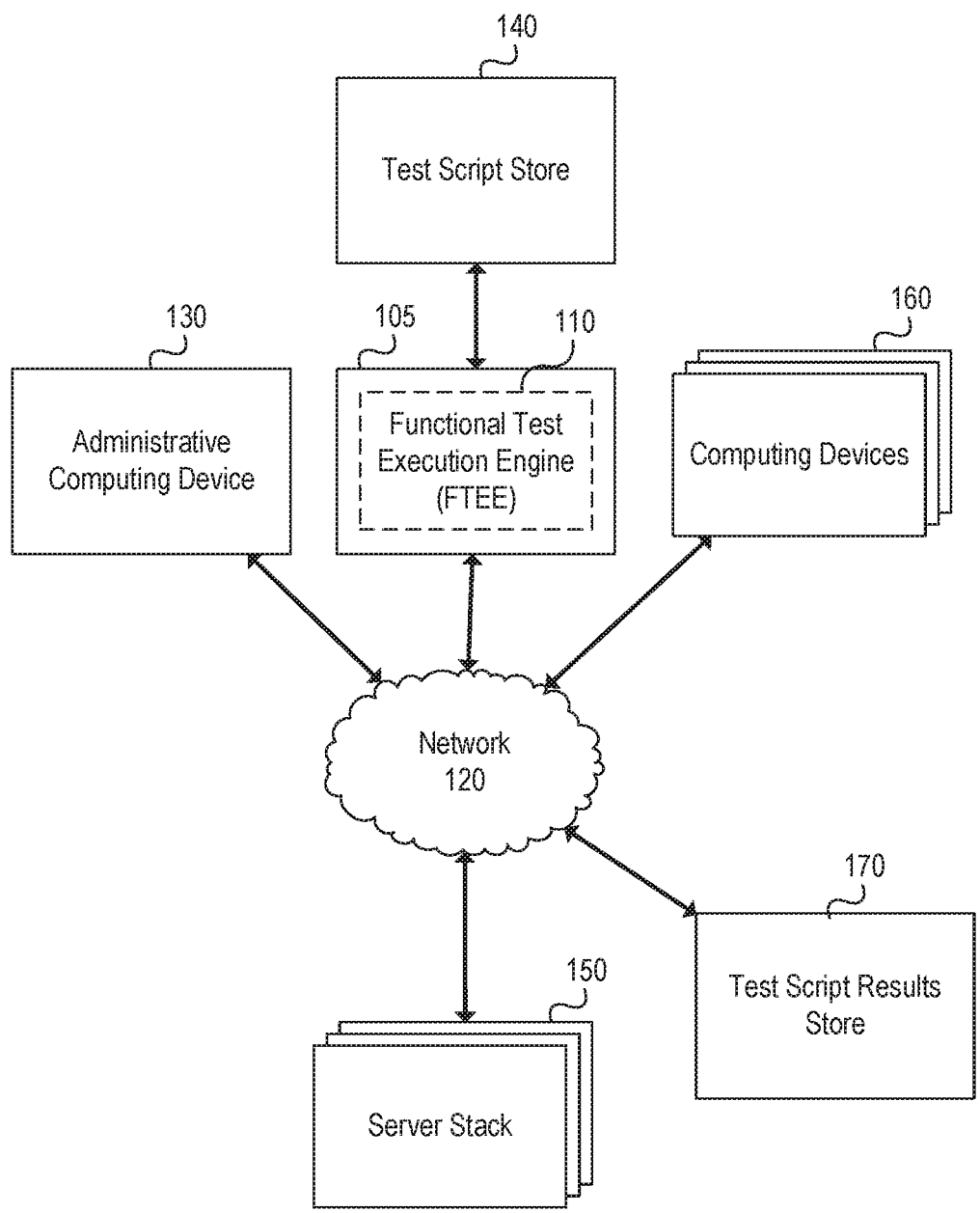
FIG. 1 shows an example computing environment within which functional tests may be executed with respect to an example server stack.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways. It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

An enterprise may have a server stack. For example, a school may have a large network of servers which store student information, class information, and similar data, along with a variety of programs for execution by individual students. The server stack may require regular maintenance: for example, an IT department of the school may regularly check that a student information database has not been corrupted, may check whether any unauthorized programs have been executed on one of the servers, and may perform similar tasks. Such tasks may be performed by one or more test scripts, which may automate the tasks. For example, an IT technician of the school may, on a regular basis, run various test scripts to iteratively test the data integrity of the student information database, run a test script to iteratively check processes executing on one or more servers of the server stack, and the like. But such test scripts may be computationally intensive, such that they may overwhelm server stack processing resources and diminish the quality of the services provided by the server stack to end users (e.g., with respect to response time, latency, and the like). In some cases, the quantity of test scripts, the length the test scripts require to operate, and the time required to execute each test script may make routine maintenance (e.g., on a weekly basis) difficult.

In order to address and overcome these challenges, the present application describes a functional test execution engine that manages execution of test scripts with respect to a server stack. By determining and causing test scripts to execute based on, for example, the processing resources of the server stack and rules associated with the test scripts, the functional test execution engine may improve server stack uptime and minimize downtime, lessen test script impact on server stack processing resources, enable enterprises to better perform routine maintenance functions on large server stacks, and ensure the health of the server stack while maintaining a high quality of service for end users. Additional benefits will be appreciated upon review of the disclosures set forth in further detail below. In part, the functional test execution engine may do this by better identifying, diagnosing, and addressing identified issues with the server stack, as well as by avoiding overburdening and/or underutilizing the processing resources of the server stack. For example, rather than having a dedicated employee execute a set of test scripts every week and potentially risk overburdening a server stack, forgetting to execute a test script on the server stack, or executing too many test scripts on the server stack at once, an organization may use a functional test execution engine to efficiently execute test scripts on the server stack.

FIG. 1 shows an example computing environment within which functional tests may be executed with respect to a server stack. The computing environment may include, as shown by way of example in FIG. 1, a specially-programmed computing device 105 configured to manage and control execution of functional tests with respect to a server stack 150. The specially-programmed computing device 105 includes a set of instructions used to manage/control execution of test scripts. For convenience, this set of instructions executing on the specially-programmed computing device 105 is referred to herein as functional test execution engine 110. The specially-programmed computing device 105 may be connected to a network 120. The network 120 may connect the functional test execution engine 110 to an administrative computing device 130, a server stack 150, computing devices 160 that are communicatively coupled with the server stack 150, and test script results store 170. The functional test execution engine 110 may be communicatively coupled, via the network 120 or otherwise, to a test script store 140.

The computing devices depicted in FIG. 1, including the computing device 105 that includes the functional test execution engine 110, the administrative computing device 130, the computing devices 160, the test script store 140, the server stack 150, and the test script results store 170, may be a single or multiple computing devices and/or programs executing on a computing device. Computing devices may comprise servers, personal computers, laptops, smartphones, routers, switches, and/or other devices with one or more processors and/or memory. For example, the administrative computing device 130 and the computing device 105 may be executing on the same personal computer, server, or other such device. As another example, the server stack 150 may be a large datacenter comprising hundreds of servers located in numerous data centers nationwide. All or portions of FIG. 1 may be executing on the same computing device.

The functional test execution engine 110 may be configured to retrieve test scripts from the test script store 140 and execute said test scripts with respect to the server stack 150. The functional test execution engine 110 may be configured to retrieve test scripts from the test script store 140 by, for example, requesting the test script from the test script store 140 and receiving the test script from the test script store 140. The test script store 140 may be storage communicatively coupled to the functional test execution engine 110, and the functional test execution engine 110 may retrieve one or more test scripts from the test script store 140. Retrieval may comprise determining available test scripts by, for example, requesting and retrieving a list of test scripts stored by the test script store 140. Execution of a test script retrieved from the test script store 140 with respect to the server stack 150 may be cause by the functional test execution engine 110 by, for example, sending instructions based on the test script to the server stack 150 and/or sending the test script to the server stack 150 and instructing the server stack 150 to execute the test script.

The network 120 may be any network, such as an Internet Protocol ("IP") network, which connects devices such as the functional test execution engine 110 and the server stack 150. The network may comprise a plurality of physical or logical links and one or more protocols. The network 120 may comprise public networks and private networks, and the private networks may connect to the public networks through other computing devices, such as a modem or router. For example, portions of the server stack 150 may be located at different places worldwide, such that the functional test execution engine 110 may connect via a first private network to a public private network and ultimately to a second private network to reach one or more servers of the server stack 150.

The administrative computing device 130 may configure the functional test execution engine 110, the test script store 140, one or more test scripts, and/or the server stack 150. For example, the administrative computing device 130 may configure the functional test execution engine 110 to execute a number of test scripts, to execute test scripts based on a time period, to provide limitations for how test scripts may be executed with respect to the server stack 150, and other such configurations. The administrative computing device 130 may configure the test script store 140 by adding, removing, or modifying test scripts and/or metadata associated with test scripts. Such metadata may comprise, for example, rules of when a test script may and may not execute, an expiration date of a test script, an estimated processing requirement of the test script, or other similar information associated with the test script.

The test script store 140 may store one or more test scripts. A test script may be any set of instructions which may execute with respect to the server stack 150. A test script may interface with a specific program and/or may execute and affect an operating system, application programming interface ("API"), or any other portion or portions of the server stack 150. The test script may itself be a program or executable which may be executed with respect to the server stack 150. A test script may perform maintenance and/or diagnostic functions on all or portions of the server stack 150. A maintenance function may comprise server clean-up and/or upgrade functions, such as deleting cache files older than a certain date and/or upgrading one or more programs executing on a server. A diagnostic function may comprise a function which may be used to, for example, determine a possible cause of a server error, test various capabilities or parameters of a server, or the like. For example, one maintenance test script may confirm Structured Query Language ("SQL") data integrity by iteratively testing rows in tables stored in SQL servers and deleting rows where certain columns are empty, whereas another diagnostic test script may cause a media server to execute specific tests to determine why the server crashes at night. Test scripts may have different implications for the processing resources (e.g., processor availability/time/threads, available memory, network bandwidth) of the server stack 150. A test script may have a processing requirement associated with an amount of processing resources, such processor time, an amount of memory, an amount of network bandwidth, an amount of processor utilization, a number of processing threads of execution (colloquially called "threads"), or the like. For example, one test script may be executable with a negligible quantity of processor threads of the server stack 150, whereas another might utilize almost all available processor threads of a substantial portion of the server stack 150.

Test scripts executed with respect to the server stack 150 may produce test script results which may be stored by the test script store 170. A test script result may be any output from a test script executed with respect to the server stack 150. For example, a test script result may comprise an indication of an error with the data integrity of all or portions of the server stack 150. For example, a test script may evaluate whether data stored in the server stack satisfies a set of data validation criteria and/or conforms to a set of data formatting criteria. The test script store 170 may be a portion of the server stack 150 or the computing devices 160. The test script store 170 may store test script results from test scripts executed with respect to the server stack 150 for later review or processing. The computing device 105, results store 170, and test script store 140 may execute on one or more computing devices. For example, computing device 105 may contain memory comprising both the test script store 140 and the test script results store 170.

The server stack 150 may be one or more computing devices, such as servers, which may, for example, store data and/or execute programs. The server stack 150 may be a single computing device, such as a single server, or a large network of interconnected servers at different locations worldwide. The server stack 150 may be configured to track and manage processing resources, such as processor use, memory capacity and use, network bandwidth, and other properties. The server stack 150 may be connected to computing devices 160, which may comprise any computing device which may interface with the server stack 150. For example, the server stack 150 may be a large database server for a video game, and the computing devices 160 may be video game consoles which may connect to the server stack 150 over the network 120 to play the video game. The server stack 150 may contain disparate types of servers, each with different processing capabilities, functions, and locations: for example, one SQL server of the server stack 150 may be located in Los Angeles, whereas a web server of the server stack 150 may be located in New York.

Figure 2:
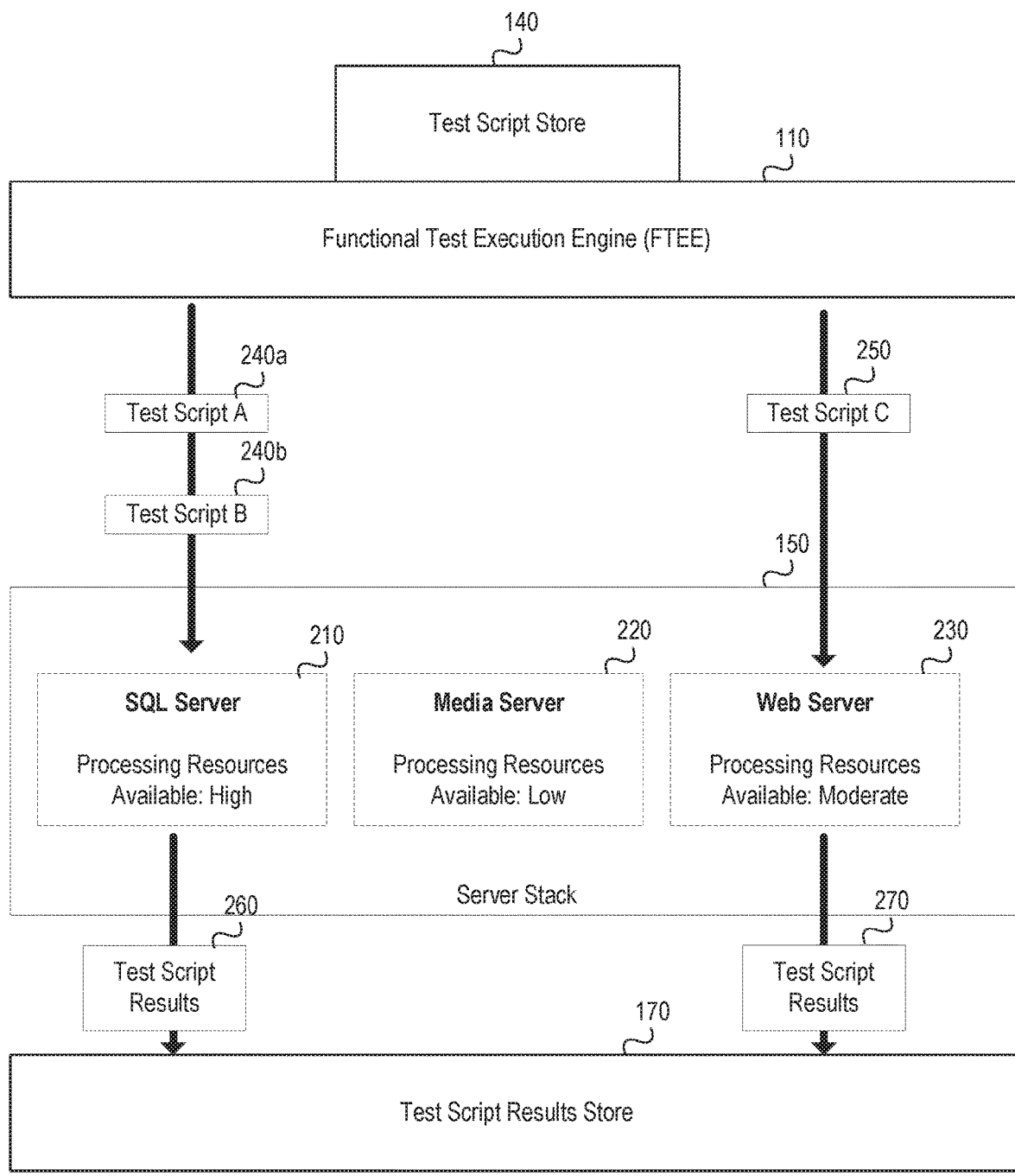
FIG. 2 shows an example data flow during execution of functional tests with respect to an example server stack.

FIG. 2 shows an example data flow during execution of functional tests with respect to an example server stack 150. The server stack 150, shown by way of example in FIG. 2, has three servers 210, 220, and 230. It should be appreciated, however, that other example server stacks may include more or fewer servers.

The three servers of the server stack 150, in this example, include SQL server 210, media server 220 and web server 230. Each server has a different amount of processing resources available. For example, the SQL server 210 is shown to have a relatively high quantity of its processing resources available (e.g., 90%), the media server 220 is shown to have a relatively low quantity of its processing resources available (e.g., 10%), and the web server 230 is shown to have a relatively moderate quantity of its processing resources available (e.g., 50%). Though processing resources are shown in FIG. 2 as a relative quantity, information regarding the status of each server in the server stack 150 may be significantly more detailed and may be relative to other servers. For example, processor utilization, processor time availability, processor threads available, network bandwidth, number of rows and/or columns stored in a database, size of data stored, and other such information may all be available with regard to any one of the servers depicted in FIG. 2. Some processing resources may not be relevant depending on the nature of test scripts being executed with respect to the server stack 150. For example, if the test scripts to be run with respect to the server stack 150 do not use network connectivity, bandwidth information may be irrelevant for the purposes of determining the ability of a server to run the test scripts. As such, the functional test execution engine 110 may be configured to request and retrieve processing resource information from all or portions of the server stack 150, and the functional test execution engine 110 may request particular processing resources based on the processing requirements of one or more test scripts.

Information corresponding to the current and historical utilization of the processing resources of all or portions of the server stack 150 may be stored and analyzed. The functional test execution engine 110 may store a history of processing resource utilization information for the server stack 150. Such a history of processing resource utilization information may be used to determine, for example, times in which the processing resources of all or portions of the server stack 150 satisfy a threshold (e.g., a time period when the server stack 150 has over 50% of its bandwidth available). The functional test execution engine 110 may use processing resource utilization information and/or historical processing resource utilization information for one server and use it to predict, in whole or in part, the processing resources for another server. For example, if the server stack 150 comprises multiple SQL servers and a new SQL server is installed in the server stack 150, then the functional test execution engine 110 may predict that the new server has the same processing resources as other SQL servers.

Based on the processing resources available for one or more servers, the functional test execution engine 110 may determine which test scripts to execute and what servers to execute those test scripts with respect to. Based on determining that a server has a large amount of processing resources available, the functional test execution engine 110 may cause a large number of test scripts to execute with respect to the server and/or may cause more computationally complex test scripts to execute with respect to the server. For example, as shown in FIG. 2, because the SQL server 210 has a relatively large amount of processing resources available, both test script A 240*a* and test script B 240*b* are sent to the SQL server 210. Based on determining that a server has a small (or, possibly, no) processing resources available, the functional test execution engine 110 may send fewer or no test scripts to the server. For example, as shown in FIG. 2, because the media server 220 has a small amount of processing resources available, no test scripts are sent. The functional test execution engine 110 may be configured to wait until the available processing resources of a server satisfy a threshold (e.g., drop below a value) before running future test scripts. The functional test execution engine 110 may selectively pick test scripts for execution based on processing resources available. For example, as shown in FIG. 2, the functional test execution engine 110 sends over test script C 250 to the web server 230, rather than the test script A 240*a* or the test script B 240*b*. The functional test execution engine may have done so because, for example, the test script C may closely use all available processing resources, because the test script is a higher priority than other test scripts, or other similar considerations.

The functional test execution engine 110 may take a variety of considerations into account when selecting a first test script and not a second test script. The functional test execution engine 110 may select a first test script over a second test script because the former has a lower processing requirement than the latter. The functional test execution engine 110 may select a first test script over a second test script because the former is associated with a higher priority (e.g., in metadata or otherwise) than the latter. The functional test execution engine 110 may select a first test script over a second test script because the former test script is specially designated for a particular portion of the server stack 150. The functional test execution engine 110 may select a group of first test scripts over a second test script because the group, collectively, has a higher priority or lower processing requirements as compared to the second test script.

The functional test execution engine 110 may be configured to use a variety of methods to manage test scripts executing with respect to the server stack 150. Parallel execution of test scripts with respect to the server stack 150 may be performed. Though FIG. 2 depicts different test scripts executing on discrete servers, the same test script may execute with respect to multiple servers of the server stack 150. The functional test execution engine 110 may be configured to monitor executing test scripts and to modify the test scripts by, for example, modifying parameters of a test script to be executed in the future based on test script results of a previously-executed test script. For example, a test script result of a first test script may suggest that a directory is corrupt, and the functional test execution engine 110 may modify a second test script configured to check directory data integrity such that the test script analyzes the directory. The functional test execution engine 110 may be configured to detect that a test script executing with respect to the server stack 150 has executed for a threshold period of time and kill one or more of the processes that execute the test script.

After one or more test scripts have been executed on one or more servers in the server stack 150, test script results associated with such execution may be sent to the test script results store 170. The test script results may correspond to one or a plurality of test scripts executed on one or more servers. For example, as shown in FIG. 2, the test script results 260 from the SQL server 210 correspond to both the execution of the test script A 240a and the test script B 240b, whereas the test script results 270 from the web server 230 correspond to the test script C 250. The test script results may include an indication that no test scripts were executed with respect to the server stack 150.

Figure 3:
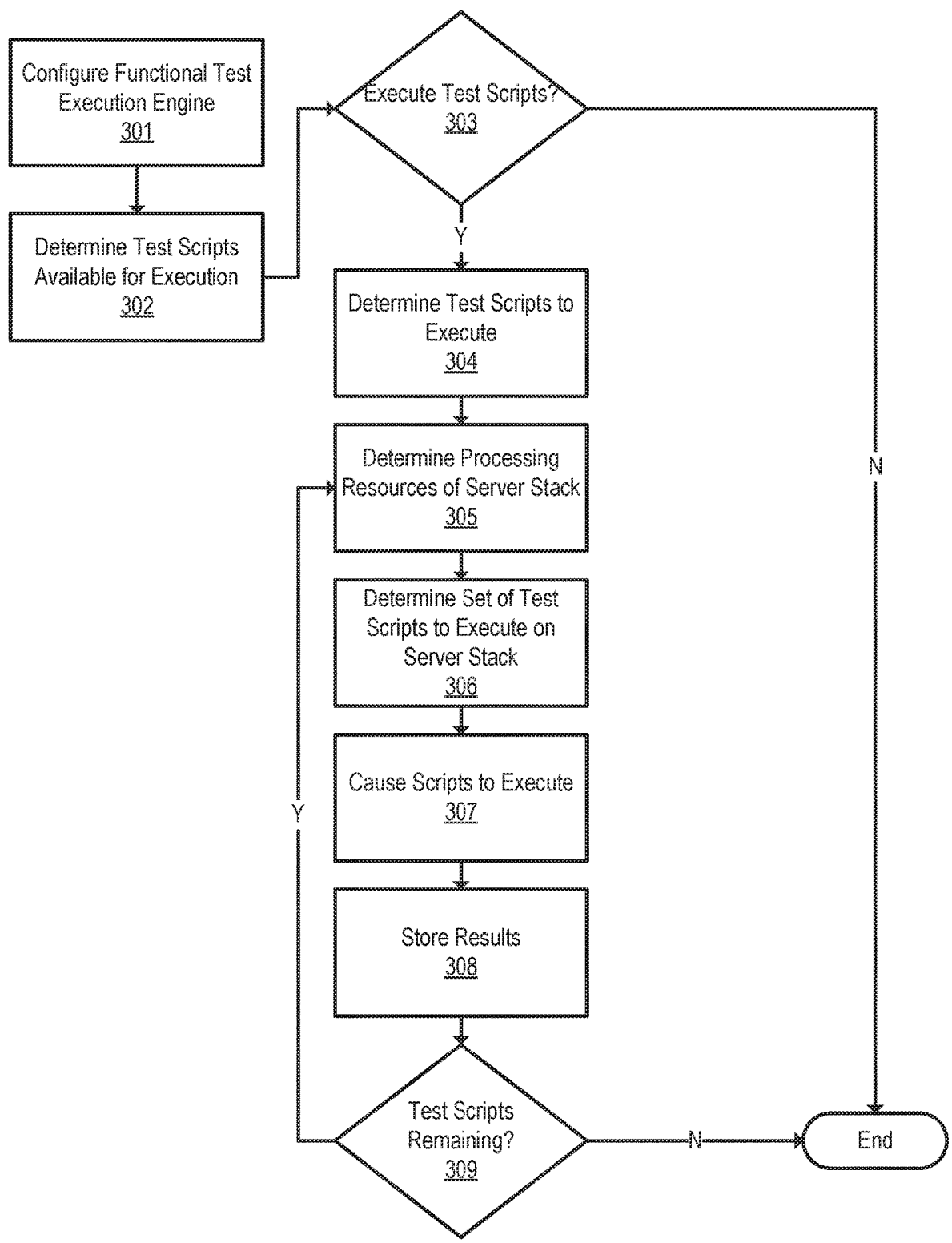
FIG. 3 shows a flow chart with example method steps for managing execution of functional tests with respect to a server stack.

FIG. 3 is a flow chart of example method steps for managing execution of functional tests with respect to a server stack. In step 301, the functional test execution engine 110 is configured. Configuration may comprise receiving configuration information from an administrator using the administrative computing device 130. Configuration may comprise retrieving external information, such as information from the computing devices 160. For example, the functional test execution engine 110 may receive an indication from one of the computing devices 160 that a large data transfer will soon originate from the one of the computing devices 160 to the server stack 150. In response to receipt of this external information, the functional test execution engine 110 may wait until the data transfer is complete before initiating execution of the test scripts. Configuration may comprise indicating which test scripts or categories of test scripts may be executed with respect to the server stack 150. For example, the configuration may specify that the functional test execution engine 110 may execute long-running test scripts only on weekends or at specified time periods (e.g., between 1:00 AM and 3:00 AM).

In step 302, the functional test execution engine 110 may, using the test script store 140, determine test scripts available for execution. The test script store 140 may store a large number of test scripts, some which may be designed for automatic, periodic, and/or aperiodic use (e.g., the functional test execution engine 110 executing a test script every week) and others limited to execute only in response to specific instruction (e.g., instruction by an administrator via the administrative computing device 130). As such, the functional test execution engine 110 need not retrieve all test scripts stored by the test script store 140, but may instead determine only test scripts which it may execute. Such a determination may be based on the configuration of the functional test execution engine 110. For example, the functional test execution engine 110 may be configured to perform media server testing on Mondays and web server testing on Fridays, such that on Mondays the functional test execution engine 110 retrieves web server-related test scripts, and on Fridays the functional test execution engine 110 retrieves media server-related test scripts. As another example, an administrator, using the administrative computing device 130, may instruct the functional test execution engine 110 to execute particular test scripts, and the functional test execution engine 110 may retrieve and cause those particular test scripts to execute with respect to the server stack 150.

In step 303, the functional test execution engine 110 may determine whether to execute one or more test scripts. The determination of whether to execute one or more test scripts may, for example, be based on the time of day, the status of the server stack 150, one or more instructions from the administrative computing device 130, a response to one or more communications from the computing devices 160, the test scripts available for execution, or other such reasons. If the functional test execution engine 110 decides to execute the test scripts, the process, in this example, proceeds to step 304. Otherwise, the process may end.

In step 304, the functional test execution engine 110 may determine, from the test scripts available for execution, which test scripts to execute. The step may comprise determining test scripts to execute for individual portions of the server stack 150. For example, the functional test execution engine 110 may determine a first set of test scripts to execute with respect to database servers, but a second set of test scripts to execute with respect to media encoding servers. Such determinations may be made on, for example, the operating status of the server stack 150, the configuration of the functional test execution engine 110, the status of the computing devices 160, and/or one or more instructions from the administrative computing device 130.

In step 305, the functional test execution engine 110 may determine the processing resources of the server stack 150. The functional test execution engine 110 may be configured to monitor the server stack 150 and determine the processing resources. Such processing resources may be determined via queries to all or portions of the server stack 150, or may be retrieved from a different computing device (e.g., one of the computing devices 160). In some cases, the functional test execution engine 110 may determine the processing resources of the server stack 150 before determining test scripts available for execution (e.g., steps 302-304). For example, the functional test execution engine 110 may determine that all or portions of the server stack 150 have limited processing resources available such that no test scripts should be executed with respect to the server stack 150.

In step 306, based on the processing resources determined, the functional test execution engine 110 may determine one or more test scripts to execute with respect to the server stack 150.

The functional test execution engine 110 may determine to execute one or more test scripts based on available processing resources of all or portions of the server stack 150. If all or portions of the server stack 150 have limited processing resources available, the functional test execution engine may select fewer and/or simpler and/or no test scripts for execution on all or portions of the server stack 150. If all or portions of the server stack 150 have a relatively large amount of processing resources available, the functional test execution engine may select greater, more computationally intensive, and/or larger test scripts for execution on all or portions of the server stack 150.

The functional test execution engine 110 may determine projected processing requirements associated with a set of test scripts. A projected processing requirement may be an estimate, by the functional test execution engine 110, of processing requirement utilization by one or more test scripts. For example, one test script may utilize 50% of server memory but only 10% of server processor threads, while another may utilize 10% of server memory and 40% of server processor threads, such that the combined set of the test scripts would utilize 60% of server memory and 50% of server processor threads. Use of percentages herein is by way of example only, and discrete quantities of processing resources may be used in accordance with the features described herein: for example, a test script may be associated with an amount (e.g., number of megabytes) of memory, or other similar quantitates associated with computational processing. As another example, the functional test execution engine 110 may analyze a test script and estimate an amount of processing requirements the test script is likely to use based on the complexity of the code of the test script (e.g., an efficiency analysis of the test script code to determine whether it is logarithmic, linear, quadratic, polynomial, exponential, factorial, and the like), whether the test script entails all or portions of the server stack 150, or similar characteristics of the test script. The functional test execution engine 110 may be configured to determine the processing requirement of test scripts that have previously executed and use such determination for future test scripts. As such, the projected processing requirement need not be exact. For example, the functional test execution engine 110 may determine a projected processing requirement based on a comparison of previously-executed test scripts and an estimation, based on the properties of a test script, of the processing requirement of the test script.

The functional test execution engine 110 may compare the projected processing requirement and processing resources available at the server stack 150 to determine which particular test scripts to execute with respect to the server stack 150. The functional test execution engine 110 may be configured to determine a set of test scripts for execution that, based on a comparison of the projected processing requirement of the set of test scripts and the processing resources available at all or portions of the server stack 150, do not exceed a threshold amount of the processing resources available at all or portions of the server stack 150. For example, the functional test execution engine 110 may initially determine to execute five test scripts but, based on a comparison of the projected processing requirement of the five test scripts and the processing resources available at a portion of the server stack 150, may instead only cause three of the five test scripts to execute with respect to the server stack 150. Such a decision may be made because the five test scripts would utilize an undesirable amount of the processing resources of all or a portion of the server stack 150 (and thereby take too long to execute, overload all or portions of the server stack 150, or other undesirable outcomes), whereas the three test scripts would not utilize a threshold amount of the processing resources available at all or a portion of the server stack 150 (and therefore may not take as long to execute and may be readily executed on all or portions of the server stack 150). Alternatively, it may be determined that the five test scripts would utilize less than the threshold amount of processing resources, and on that basis those five test scripts may be selected for execution in favor of the three test scripts.

The functional test execution engine 110 may be configured to monitor and/or measure the actual utilization, by one or more test scripts, of the processing requirement of all or portions of the server stack 150. The functional test execution engine 110 may be configured to store actual utilization over time and/or over one or more instances of execution as historical processing resource usage data. The functional test execution engine 110 may thereby learn how to use the available processing resources of the server stack 150. For example, the functional test execution engine 110 may compare the historical processing resource usage information of a test script to the processing resources available at the server stack 150 to determine whether to execute the test script with respect to the server stack 150.

The functional test execution engine 110 may determine to execute one or more test scripts based on previous test script results from previously-executed test scripts. The functional test execution engine 110 may retrieve stored test script results from the test script results store 170 and, based on those test script results, determine test scripts to execute. For example, a previous test script may suggest that a large number of programs executing on media servers in the server stack 150 are not responding, and, in response, the functional test execution engine 110 may determine to run a series of test scripts to diagnose why the programs are not responding.

The functional test engine 110 may cause test scripts to execute with respect to the server stack 150 based on one or more rules associated with the test scripts. The functional test execution engine 110 may, based on a rule, manage test scripts based on priority. Such a rule may reflect that, for example, a first test script may generate results required for a second test script to execute. As another example, some test scripts may generate test script results that may be time-sensitive (and thus may warrant early execution), whereas other test scripts may generate test script results that are not time sensitive (and thus need not warrant early execution). As yet another example, a rule may require that a set of test scripts be executed in a specified order.

The functional test execution engine 110 may additionally or alternatively determine a period of time that the functional test execution engine 110 and/or all or portions of the server stack 150 should wait before executing test scripts. The functional test execution engine 110 may determine, based on considerations such as available processing resources of the server stack 150, information received from the computing devices 160, and/or the test scripts determined in step 304, that the functional test execution engine 110 and/or the server stack 150 must wait before further test scripts are executed with respect to the server stack 150. For example, the functional test execution engine 110 may determine that the likelihood of a power outage in a specific hour is high, such that test scripts should not be executed during that hour. As another example, the server stack 150 may determine that it will soon execute programs that may utilize a large amount of processing resources and delay execution of one or more test scripts until the programs have completed execution.

In step 307, the functional test execution engine 110 may cause the test scripts to execute with respect to the server stack 150. The test scripts may be executed on all or portions of the server stack 150.

The execution of one or more test scripts may generate test script results. The test script results may be any test script output, such as an indication that the test script has executed successfully and/or various diagnostic details associated with the server stack 150. For example, a test script result may indicate that one or more test scripts have completed or failed to complete. As another example, a test script may be configured to iteratively test rows for data integrity in an SQL database, and the test script results may comprise a listing of rows which failed a data integrity test. As yet another example, a test script may have failed, and a corresponding test script result may provide one or more indications of why the test script failed (e.g., stack overflow, file(s) not found, or other similar reasons that the test script may have not been able to execute).

In step 308, the functional test execution engine 110 may cause the test script results from the test scripts executing with respect to the server stack 150 to be stored. The test script results may be an indication that a test script executed successfully, an indication of an error with respect to either test script execution and/or all or portions of the server stack 150, or another form of output associated with one or more test scripts. Storage may comprise storing the test script results in the test script results store 170. Not all test script results need be stored. For example, empty test script results may not be stored. The functional test execution engine 110 may be configured to determine which test script results are stored and which are not.

In step 309, the functional test execution engine 110 may determine if there are further test scripts to execute. Some test scripts may remain but, based on determining which test scripts to execute in step 306, the functional test execution engine 110 may determine that no further test script execution is warranted. For example, all test scripts executed with respect to the server stack 150 may have failed, such that further attempts at causing test scripts to execute may be meaningless. If the functional test execution engine decides that there are further test scripts to execute, it may repeat steps 305-308. Otherwise, the process may end.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, random access memory ("RAM"), and the like. The functionality of the program modules may be combined or distributed as desired in various embodiments. In addition, the functionality may be embodied in whole or in part in firmware or hardware equivalents, such as integrated circuits, application-specific integrated circuits ("ASICs"), field programmable gate arrays ("FPGA"), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

Although examples are described above, features and/or steps of those examples may be combined, divided, omitted, rearranged, revised, and/or augmented in any desired manner. Various alterations, modifications, and improvements will readily occur to those skilled in the art. While some elements may be expressed as singular or plural, such elements may be either singular or plural in various embodiments. For example, though a single functional test execution engine 110 is described, multiple dynamic user interface computing platforms may be used in accordance with the features described herein. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   determining, by a computing device, test scripts stored at a first storage device, wherein the test scripts are configured to execute with respect to a server stack, wherein the test scripts, when executed, are configured to perform at least one of a server maintenance function or a server diagnostic function, and wherein the test scripts are stored at a second storage device that is different from the first storage device;
   selecting one or more of the test scripts for execution;
   estimating, based on analyzing the one or more of the test scripts for execution, processing requirements corresponding to the one or more of the test scripts for execution;
   sending, by the computing device and to the server stack, a request for an indication of processing resources of the server stack;
   receiving, by the computing device and from the server stack, the indication of the processing resources of the server stack;
   selecting, by the computing device and from the one or more of the test scripts, a first set of test scripts, wherein selecting the first set of test scripts is based on a comparison of the indication of the processing resources of the server stack and the estimated processing requirements corresponding to the one or more of the test scripts for execution;

determining, by the computing device and based on the indication of the processing resources of the server stack, a first indication of first processing resources of a first portion of the server stack and a second indication of second processing resources of a second portion of the server stack;

determining, by the computing device and based on the first indication of the first processing resources of the first portion of the server stack, a first subset of the first set of test scripts for execution on the first portion of the server stack;

determining, by the computing device and based on the second indication of the second processing resources of the second portion of the server stack, a second subset of the first set of test scripts for execution on the second portion of the server stack;

causing, by the computing device, the first set of test scripts to execute with respect to the server stack in order to generate test script results, wherein causing the first set of test scripts to execute with respect to the server stack further comprises causing the first subset of the first set of test scripts to execute with respect to the first portion of the server stack and causing the second subset of the first set of test scripts to execute with respect to the second portion of the server stack; and causing, by the computing device, the test script results to be stored.

2. The method of claim 1, further comprising:
receiving, by the computing device, an instruction to perform a maintenance function with respect to the server stack, wherein the one or more of the test scripts are selected based on the maintenance function.

3. The method of claim 1, further comprising:
selecting, by the computing device and from the one or more of the test scripts, a second set of test scripts to not execute.

4. The method of claim 1, further comprising:
determining, by the computing device and based on the indication of the processing resources of the server stack, a period of time to wait before causing the first set of test scripts to execute, wherein the computing device causes the first set of test scripts to execute after the period of time has elapsed.

5. The method of claim 1, further comprising:
determining, by the computing device and based on the test script results, an error associated with the server stack; and
determining, by the computing device and based on the error, a second set of test scripts from the one or more of the test scripts.

6. The method of claim 1, further comprising:
monitoring, by the computing device, the first set of test scripts executing with respect to the server stack; and
determining, by the computing device and based on the monitoring, a history of processing requirements of the first set of test scripts, wherein the estimated processing requirements are based on the history of the processing requirements.

7. The method of claim 1, wherein the test scripts are associated with different programs executing with respect to the server stack.

8. The method of claim 1, wherein causing the first set of test scripts to execute with respect to the server stack comprises sending the test scripts to the server stack.

9. The method of claim 1, wherein one of the first set of test scripts is configured to perform a diagnostic function, and wherein the diagnostic function is configured to determine a possible cause for an error on all or a portion of the server stack.

10. The method of claim 1, wherein one of the first set of test scripts is configured to perform a maintenance function, and wherein the maintenance function is configured to determine integrity of data on all or a portion of the server stack.

11. A computing device comprising:
one or more processors; and
memory storing instructions that, when executed by the one or more processors, cause the computing device to:
determine test scripts stored at a first storage device, wherein the test scripts are configured to execute with respect to a server stack, wherein the test scripts, when executed, are configured to perform at least one of a server maintenance function or a server diagnostic function, and wherein the test scripts are stored at a second storage device that is different from the first storage device;
select one or more of the test scripts for execution;
estimate, based on analyzing the one or more of the test scripts for execution, processing requirements corresponding to the one or more of the test scripts for execution;
send, to the server stack, a request for an indication of processing resources of the server stack;
receive, from the server stack, the indication of the processing resources of the server stack;
select, from the one or more of the test scripts, a first set of test scripts, wherein selecting the first set of test scripts is based on a comparison of the indication of the processing resources of the server stack and the estimated processing requirements corresponding to the one or more of the test scripts for execution;
determine, based on the indication of the processing resources of the server stack, a first indication of first processing resources of a first portion of the server stack and a second indication of second processing resources of a second portion of the server stack;
determine, based on the first indication of the first processing resources of the first portion of the server stack, a first subset of the first set of test scripts for execution on the first portion of the server stack;
determining, by the computing device and based on the second indication of the second processing resources of the second portion of the server stack, a second subset of the first set of test scripts for execution on the second portion of the server stack;
cause the first set of test scripts to execute with respect to the server stack in order to generate test script results, wherein causing the first set of test scripts to execute with respect to the server stack further comprises causing the first subset of the first set of test scripts to execute with respect to the first portion of the server stack and causing the second subset of the first set of test scripts to execute with respect to the second portion of the server stack; and
cause the test script results to be stored.

12. The computing device of claim 11, wherein the instructions, when executed by the one or more processors, further cause the computing device to:
receive an instruction to perform a maintenance function with respect to the server stack, wherein the one or more of the test scripts are selected based on the maintenance function.

13. The computing device of claim 11, wherein the instructions, when executed by the one or more processors, further cause the computing device to:

select, from the one or more of the test scripts, a second set of test scripts to not execute.

14. The computing device of claim 11, wherein the instructions, when executed by the one or more processors, further cause the computing device to:

determining, by the computing device and based on the indication of the processing resources of the server stack, a period of time to wait before causing the first set of test scripts to execute, wherein the computing device causes the first set of test scripts to execute after the period of time has elapsed.

15. A system comprising:

a server stack comprising a plurality of servers executing one or more programs; and a computing device, wherein the computing device is configured to:

determine test scripts stored at a first storage device, wherein the test scripts are configured to execute with respect to a server stack, wherein the test scripts, when executed, are configured to perform at least one of a server maintenance function or a server diagnostic function, and wherein the test scripts are stored at a second storage device that is different from the first storage device;

select one or more of the test scripts for execution;

estimate, based on analyzing the one or more of the test scripts for execution, processing requirements corresponding to the one or more of the test scripts for execution;

send, to the server stack, a request for an indication of processing resources of the server stack;

receive, from the server stack, the indication of the processing resources of the server stack;

select, from the one or more of the test scripts, a first set of test scripts, wherein selecting the first set of test scripts is based on a comparison of the indication of the processing resources of the server stack and the estimated processing requirements corresponding to the one or more of the test scripts for execution;

determine, based on the indication of the processing resources of the server stack, a first indication of first processing resources of a first portion of the server stack and a second indication of second processing resources of a second portion of the server stack;

determine, based on the first indication of the first processing resources of the first portion of the server stack, a first subset of the first set of test scripts for execution on the first portion of the server stack;

determine, based on the second indication of the second processing resources of the second portion of the server stack, a second subset of the first set of test scripts for execution on the second portion of the server stack;

cause the first set of test scripts to execute with respect to the server stack in order to generate test script results, wherein causing the first set of test scripts to execute with respect to the server stack further comprises causing the first subset of the first set of test scripts to execute with respect to the first portion of the server stack and causing the second subset of the first set of test scripts to execute with respect to the second portion of the server stack; and cause the test script results to be stored.

16. The system of claim 15, wherein the computing device is further configured to:

receive an instruction to perform a maintenance function with respect to the server stack, wherein the one or more of the test scripts are selected based on the maintenance function.

17. The system of claim 15, wherein the computing device is further configured to:

determine, based on the indication of the processing resources of the server stack, a period of time to wait before causing the first set of test scripts to execute, wherein the computing device causes the first set of test scripts to execute after the period of time has elapsed.

18. The system of claim 15, wherein the computing device is further configured to:

select, from the one or more of the test scripts, a second set of test scripts to not execute.

19. The system of claim 15, wherein the test scripts are associated with different programs executing with respect to the server stack.

* * * * *